US012663676B2

(12) United States Patent
Zhao et al.

(10) Patent No.: US 12,663,676 B2
(45) Date of Patent: Jun. 23, 2026

(54) DISPLAY PANEL AND DISPLAY DEVICE

(71) Applicant: Guangzhou China Star Optoelectronics Semiconductor Display Technology Co., LTd., Guangzhou (CN)

(72) Inventors: Bin Zhao, Guangzhou (CN); Juncheng Xiao, Guangzhou (CN); Shan Li, Guangzhou (CN); Kuhuang Lai, Guangzhou (CN); Wei Liu, Guangzhou (CN); Huaipei Wang, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 35 days.

(21) Appl. No.: 18/569,229

(22) PCT Filed: Oct. 31, 2023

(86) PCT No.: PCT/CN2023/128886
§ 371 (c)(1),
(2) Date: Dec. 12, 2023

(87) PCT Pub. No.: WO2025/086322
PCT Pub. Date: May 1, 2025

(65) Prior Publication Data
US 2025/0251628 A1     Aug. 7, 2025

(30) Foreign Application Priority Data
Oct. 27, 2023     (CN) .......................... 202311418889.0

(51) Int. Cl.
*G02F 1/1339*     (2006.01)
*G02F 1/1333*     (2006.01)
(Continued)

(52) U.S. Cl.
CPC ...... *G02F 1/1339* (2013.01); *G02F 1/133368* (2021.01); *G02F 1/133512* (2013.01); *G02F 1/1337* (2013.01)

(58) Field of Classification Search
CPC ............. G02F 1/1339; G02F 1/133368; G02F 1/133512; G02F 1/1337; G02F 1/13394; G02F 1/13396
(Continued)

(56) References Cited

U.S. PATENT DOCUMENTS

2009/0059155 A1* 3/2009 Nakayama .......... G02F 1/13394
349/156
2015/0253607 A1* 9/2015 Cho ...................... G02F 1/1337
349/110
(Continued)

FOREIGN PATENT DOCUMENTS

CN     106918967 A     7/2017
CN     108710242 A     10/2018
(Continued)

OTHER PUBLICATIONS

Espacenet english machine translation of CN110187569A (Year: 2019).*
(Continued)

*Primary Examiner* — David Y Chung
(74) *Attorney, Agent, or Firm* — PV IP PC; Peter Stecher; Wei Te Chung

(57)     ABSTRACT

A display panel and a display device are provided. A display panel includes a first substrate, a second substrate and a photo spacer disposed between the first substrate and the second substrate. The first substrate includes a first base and a first alignment layer. The first alignment layer includes a first portion and a second portion. The second portion surrounds the first portion. One end of the photo spacer is connected to the second substrate, and the other end of the photo spacer corresponds to the first portion. A distance between the first portion and the second substrate is different from a distance between the second portion and the second substrate.

13 Claims, 5 Drawing Sheets

(51) Int. Cl.
    G02F 1/1335     (2006.01)
    G02F 1/1337     (2006.01)

(58) Field of Classification Search
    USPC .......................................................... 349/156
    See application file for complete search history.

(56)              References Cited

U.S. PATENT DOCUMENTS

| | | | |
|---|---|---|---|
| 2015/0253608 A1* | 9/2015 | Cho | G02F 1/13394 349/110 |
| 2018/0231829 A1* | 8/2018 | Itou | G02F 1/1343 |
| 2019/0353940 A1* | 11/2019 | Zhao | G02F 1/136286 |

FOREIGN PATENT DOCUMENTS

| | | | | |
|---|---|---|---|---|
| CN | 110187569 A | * | 8/2019 | ......... G02F 1/13394 |
| CN | 110456577 A | | 11/2019 | |
| CN | 112130380 A | | 12/2020 | |
| CN | 113359357 A | | 9/2021 | |
| CN | 114153097 A | | 3/2022 | |
| CN | 217112994 U | | 8/2022 | |
| CN | 115877614 A | | 3/2023 | |
| KR | 20150105597 A | | 9/2015 | |

OTHER PUBLICATIONS

International Search Report in International application No. PCT/CN2023/128886, mailed on Jul. 25, 2024.
Written Opinion of the International Search Authority in International application No. PCT/CN2023/128886, mailed on Jul. 25, 2024.
Chinese Office Action issued in corresponding Chinese Patent Application No. 202311418889.0 dated Mar. 21, 2026, pp. 1-9.

* cited by examiner

300

M2

M1          109

200
203  204  202  201  2021  300  1121 1122  400

110  105  104  106  109  101  107  103  108  102 111 112

100

DISPLAY PANEL AND DISPLAY DEVICE

CROSS REFERENCE TO RELATED APPLICATIONS

This application is a US national phase application based upon an International Application No. PCT/CN2023/128886, filed on Oct. 31, 2023, which claims priority to Chinese Patent Application No. 202311418889.0, filed on Oct. 27, 2023, and entitled "DISPLAY PANEL AND DISPLAY DEVICE", which are incorporated herein by reference in their entirety.

TECHNICAL FIELD

The present application relates to the field of display technologies, and more particularly, to a display panel and a display device.

BACKGROUND

With the development of display technology, flat panel display devices such as liquid crystal displays (LCDs) are widely used in various consumer electronic products such as mobile phones, televisions, personal digital assistants, digital cameras, notebook computers, and desktop computers because of their high image quality, power saving, and wide application range, so these flat panel display devices become the mainstream of display devices.

The liquid crystal display panel includes an array substrate and a color film substrate, and a liquid crystal layer and a photo spacer (PS) are disposed between the array substrate and the color film substrate. In the related art, the end of the PS is in direct contact with the first alignment layer, so that the first alignment layer is easily scratched, and grouped dark gray spots are appeared in the scratched region, thereby affecting the display quality of the display panel. In order to improve this problem, a Black Matrix (BM) needs to be provided at a portion of the color film substrate which corresponds to the PS, so as to prevent the light from transmitting the scratched region. However, due to the fact that the photo spacers are prone to being offset when assembled, and that the BM needs to cover the entire region within the offset distances of the photo spacers, the design area of the black matrix is relatively large, thereby causing a problem that the aperture ratio of the display panel is relatively low. Thus, this problem urgently needs to be solved.

SUMMARY

The present application provides a display panel and a display device, which can effectively solve a problem that an existing display panel has a low aperture ratio.

According to a first aspect, the present application provides a display panel including a first substrate, a second substrate, and a photo spacer disposed between the first substrate and the second substrate, the first substrate and/or the second substrate comprising a light shielding layer having a plurality of apertures, and an orthographic projection of the light shielding layer on the first substrate covering at least a portion of an orthographic projection of the photo spacer on the first substrate; in which the first substrate includes a first base and a first alignment layer disposed on one side of the first substrate which faces towards the second substrate, the first alignment layer includes a first portion and a second portion, the second portion surrounds around the first portion, one end of the photo spacer is connected to the second substrate, an other end of the photo spacer corresponds to the first portion, and a distance between the first portion and the second substrate is different from a distance between the second portion and the second substrate.

Optionally, the orthographic projection of the light shielding layer on the first substrate covers an orthographic projection of the first portion on the first substrate.

Optionally, a distance between the first portion and the second substrate is less than a distance between the second portion and the second substrate.

Optionally, the first substrate comprises a plurality of metal layers disposed between the first base and the first alignment layer, and one of the plurality of metal layers which is closest to the first alignment layer is a first metal layer, in which the first metal layer overlaps the first portion and does not overlap the second portion in a direction perpendicular to the first base; or, in the direction perpendicular to the first base, the first metal layer overlaps the first portion and the second portion, and a thickness of a portion of the first metal layer which is overlapped with the first portion is greater than a thickness of a portion of the first metal layer which is overlapped with the second portion.

Optionally, a distance between the first portion and the second substrate is greater than a distance between the second portion and the second substrate.

Optionally, the first substrate includes a plurality of metal layers disposed between the first base and the first alignment layer, and one of the plurality of metal layers which is closest to the first alignment layer is a first metal layer, in which the first metal layer overlaps the second portion and does not overlap the first portion in a direction perpendicular to the first base.

Optionally, the first substrate includes a plurality of metal layers disposed between the first base and the first alignment layer, and one of the plurality of metal layers which is closest to the first alignment layer is a first metal layer, in which in a direction perpendicular to the first base, the first metal layer overlaps the first portion and the second portion, and a thickness of a portion of the first metal layer which is overlapped with the first portion is smaller than a thickness of a portion of the first metal layer which is overlapped with the second portion.

Optionally, the first substrate includes a plurality of metal layers disposed between the first base and the first alignment layer, one of the plurality of metal layers which is closest to the first alignment layer is a first metal layer, the first metal layer overlaps the first portion and the second portion, and a thickness of a portion of the first metal layer which is overlapped with the first portion is equal to a thickness of a portion of the first metal layer which is overlapped with the second portion, in which a first passivation layer is disposed between the first metal layer and the first alignment layer, the first passivation layer overlaps the second portion and does not overlap the first portion in a direction perpendicular to the first base.

Optionally, the first substrate includes a plurality of metal layers disposed between the first base and the first alignment layer, one of the plurality of metal layers which is closest to the first alignment layer is a first metal layer, and a first passivation layer is disposed between the first metal layer and the first alignment layer, in a direction perpendicular to the first base, the first metal layer overlaps the first portion and the second portion, and a thickness of a portion of the first metal layer which is overlapped with the first portion is greater than a thickness of a portion of the first metal layer which is overlapped with the second portion; the first passivation layer overlaps the second portion and does not overlap the first portion in the direction perpendicular to the first base.

Optionally, the first substrate includes a plurality of metal layers disposed between the first base and the first alignment layer, and one of the plurality of metal layers which is closest to the first alignment layer is a first metal layer, the first metal layer overlaps the first portion and the second portion, and a thickness of a portion of the first metal layer which is overlapped with the first portion is equal to a thickness of a portion of the first metal layer which is overlapped with the second portion, in which a first passivation layer is disposed between the first metal layer and the first alignment layer, in the direction perpendicular to the first base, the first passivation layer overlaps the first portion and the second portion, and a thickness of a portion of the first passivation layer which is overlapped with the first portion is smaller than a thickness of a portion of the first passivation layer which is overlapped with the second portion.

Optionally, the first metal layer is disposed on an intersection region of an extension line of a data line and an extension line of a scan line, and/or the orthographic projection of the light shielding layer on the first substrate covers an orthographic projection of the first metal layer on the first substrate.

According to a second aspect, the present application provides a display device including a housing and any one of the above display panel, in which the housing includes an accommodating space and the display panel is disposed in the accommodating space.

Beneficial Effect

A display panel and a display device are provided by the present application, and the display panel includes a first substrate, a second substrate, and a photo spacer disposed between the first substrate and the second substrate, the first substrate and/or the second substrate includes a light shielding layer having a plurality of apertures, and an orthographic projection of the light shielding layer on the first substrate overlaps at least a portion of the orthographic projection of the photo spacer on the first substrate; in which the first substrate includes a first base and a first alignment layer. The first alignment layer is disposed on one side of the first substrate which faces towards the second substrate. The first alignment layer includes a first portion and a second portion. The second portion surrounds the first portion. One end of the photo spacer is connected to the second substrate, another end of the photo spacer is disposed corresponding to the first portion, and a distance between the first portion and the second substrate is different from a distance between the second portion and the second substrate. According to the present application, the problem of scratching the first alignment layer by the offset photo spacer is improved, so that the probability of generating grouped dark gray spots in the first alignment layer is greatly reduced, the display quality of the display panel is improved, the setting area of the light shielding layer is reduced, the aperture area of the light shielding layer can be set larger, and the aperture ratio of the display panel is improved.

BRIEF DESCRIPTION OF THE DRAWINGS

In order that the technical solution in the embodiments of the present application may be explained more clearly, reference will now be made briefly to the accompanying drawings required for the description of the embodiments. It will be apparent that the accompanying drawings in the following description are merely some of the embodiments of the present application, and other drawings may be made to those skilled in the art without involving any inventive effort.

LIST OF REFERENCE NUMBERS

Figure 1:
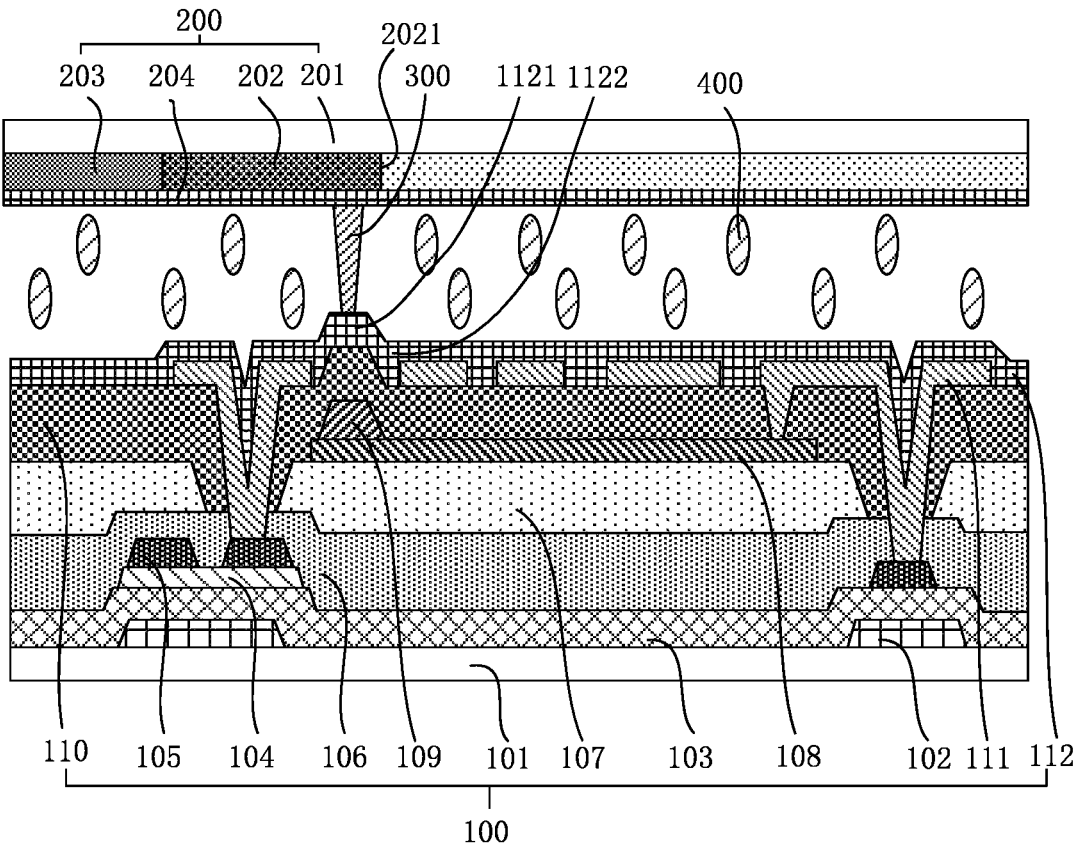
FIG. 1 is a schematic cross-sectional view of a photo spacer without offset in a display panel according to Example 1 of the present application.

First substrate 100; second substrate 200; photo spacer 300; liquid crystal layer 400; first base 101; gate metal layer 102; gate insulating layer 103; active layer 104; source-drain metal layer 105; first insulating layer 106; protective layer 107; common electrode layer 108; first metal layer 109; first passivation layer 110; pixel electrode layer 111; first alignment layer 112; first portion 1121; second portion 1122; second base 201; light shielding layer 202; aperture 2021; color film layer 203; and second alignment layer 204.

DETAILED DESCRIPTION

In the following, the technical solutions in the embodiments of the present disclosure will be clearly and completely described in combination with the accompanying drawings in the embodiments of the present disclosure. It will be apparent that the described embodiments are merely a part of the embodiments of the present disclosure, rather than all the embodiments. Based on the embodiments in the present disclosure, all other embodiments obtained by a person skilled in the art without involving any inventive effort are within the scope of the present disclosure. Furthermore, it is to be understood that the specific embodiments described herein are for purposes of illustration and explanation only and are not intended to limit the disclosure. In the present disclosure, unless otherwise specified, the directional words used such as "upper" and "lower" usually refer to the upper and lower positions with respect to the device in actual use or working conditions, specifically to the direction in the drawings; while "inside" and "outside" refer to the outline of the device.

The following disclosure provides many different embodiments or examples for implementing the different structures of the present application. In order to simplify the disclosure of the present application, components and arrangements of specific examples are described below. Of course, they are merely examples and are not intended to limit the application. In addition, the present application may repeat reference numerals and/or reference letters in various instances, such repetition being for the purpose of simplicity and clarity, without itself indicating a relationship between the various embodiments and/or arrangements discussed. In addition, the present application provides examples of various specific processes and materials, but one of ordinary skill in the art will recognize the application of other processes and/or the use of other materials. In the following detailed description, it is to be noted that the order in which the following embodiments are described is not intended to limit the preferred order of the embodiments.

Example 1

Figure 2:
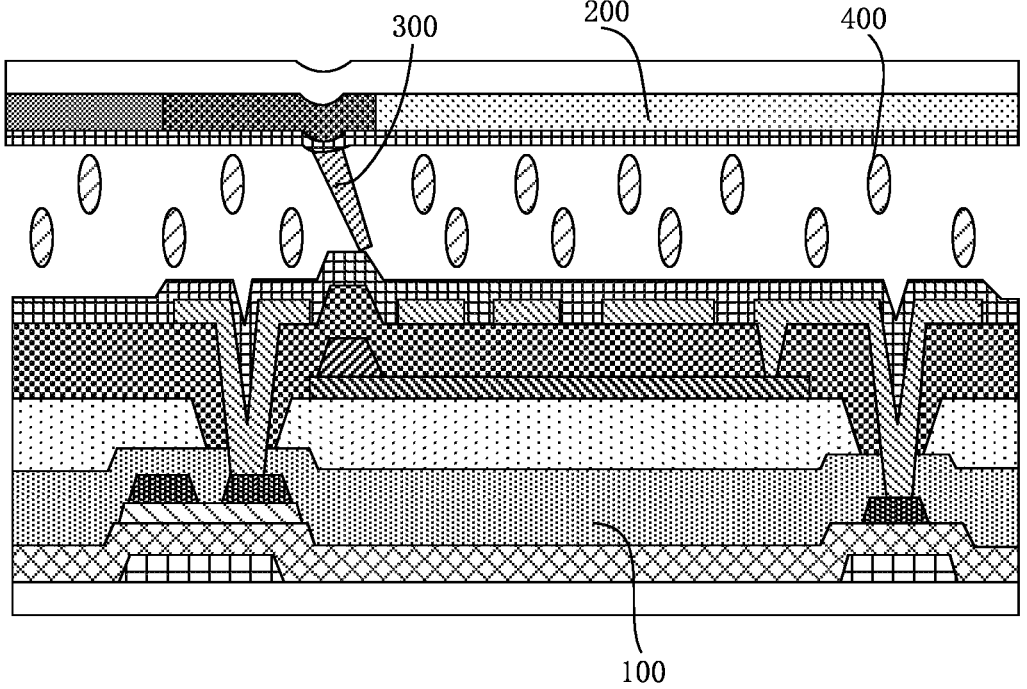
FIG. 2 is a schematic cross-sectional view of a photo spacer with offset in a display panel according to Example 1 of the present application.

FIG. 1 is a schematic cross-sectional view of a photo spacer without offset in a display panel according to Example 1 of the present application; and FIG. 2 is a schematic cross-sectional view of a photo spacer with offset in a display panel according to Example 1 of the present application. As shown in FIGS. 1 and 2, a first aspect of the present application provides a display panel, for example, a liquid crystal display panel. The display panel includes a first substrate 100, a second substrate 200, and a photo spacer 300 disposed between the first substrate 100 and the second substrate 200. The first substrate 100 and/or the second substrate 200 include a light shielding layer 202 having a plurality of apertures 2021, and an orthographic projection of the light shielding layer 202 on the first substrate 100 covers at least a portion of an orthographic projection of the photo spacer 300 on the first substrate 100. The first substrate 100 includes a first base 101 and a first alignment layer 112. The first alignment layer 112 is disposed on one side of the first base 101 which faces toward the second substrate 200. The first alignment layer 112 includes a first portion 1121 and a second portion 1122, and the second portion 1122 surrounds the first portion 1121. One end of the photo spacer 300 is connected to the second substrate 200, and the other end of the photo spacer 300 is disposed corresponding to the first portion 1121. A distance between the first portion 1121 and the second substrate 200 is different from a distance between the second portion 1122 and the second substrate 200.

In the related art, since the orthographic projection of the light shielding layer 202 on the first substrate 100 covers at least a portion of the orthographic projection of the photo spacer 300 on the first substrate 100, when the photo spacer 300 is offset by an external force, the portion of the photo spacer 300 which originally overlaps the light shielding layer 202 may be offset beyond the orthographic projection region of the light shielding layer 202. When the display panel is pressed, one end of the photo spacer 300 which faces toward the first substrate 100 is in contact with the first alignment layer 112 on the first substrate 100. In this case, if the photo spacer 300 is offset, the partial region of the first alignment layer 112 may be scratched due to the offset of the photo spacer 300, and the scratched first alignment layer 112 may generate grouped dark gray spots. If the grouped dark gray spots are not covered by the light shielding layer 202, the display quality of the display panel may be reduced. In order for the light shielding layer 202 in the display panel to cover the grouped dark gray spots when the photo spacer 300 is offset, it is necessary to increase the area of the light shielding layer 202 and reduce the area of the apertures 2021 in the light shielding layer 202. The color film layer 203 provided in the aperture 2021 of the light-shielding layer 202 corresponds to the light-transmitting region (or aperture region) of the display panel. The larger the area of the aperture 2021 of the light-shielding layer 202, the larger the area of the color film layer 203 in the aperture 2021 of the light-shielding layer 202, and the larger the area of the corresponding light-transmitting region of the display panel. Therefore, the area of the apertures 2021 in the light-shielding layer 202 is positively related to the aperture ratio of the display panel. When the setting area of the light-shielding layer 202 increases, the aperture ratio of the display panel decreases.

In the display panel provided in the present application, since one end of the first alignment layer 112 which faces toward the first substrate 100 corresponds to the first portion 1121, and the first portion 1121 is surrounded by the second portion 1122, when the display panel is subjected to an external force and the photo spacers 300 are in contact with the first alignment layer 112, one end of each photo spacer 300 which faces toward the first substrate 100 is in contact with the first portion 1121. In this case, if the photo spacer 300 is offset, the photo spacer 300 in contact with the first portion 1121 tends to be offset toward the second portion 1122. However, since the distance between the first portion 1121 and the second substrate 200 is different from the distance between the second portion 1122 and the second substrate 200, even if the photo spacer 300 is offset, the photo spacer 300 does not contact with the second portion 1122 or the contact force between the photo spacer 300 and the second portion 1122 is greatly reduced. As a result, the problem of scratching the first alignment layer 112 by the offset photo spacer 300 is improved, so that the probability of generating grouped dark gray spots in the first alignment layer 112 is greatly reduced, the display quality of the display panel is improved, the setting area of the light shielding layer 202 is reduced, and the area of the apertures 2021 of the light shielding layer 202 can be set larger, thereby improving the aperture ratio of the display panel.

In some embodiments of the present application, the photo spacers 300 in the display panel include primary photo spacers.

In the display panel provided in the present application, a length of the main photo spacer is larger than a length of the auxiliary photo spacer in the direction in which the second substrate 200 faces towards the first substrate 100. Therefore, when the display panel is subjected to an external force, the main photo spacer first contacts the first alignment layer 112, which generates a pressing force and an offset force. Therefore, the present application preferentially forms the first portion 1121 and the second portion 1122 in a region of the first alignment layer 112 which is corresponding to the main photo spacer.

In some embodiments of the present application, the photo spacers 300 in the display panel also include auxiliary photo spacers. The reason for this is that when the display panel is subjected to a larger external force, the auxiliary photo spacer may also be in contact with the first alignment layer 112, and a squeezing force and an offset force are generated. Therefore, by forming the first portions 1121 and the second portions 1122 in a region of the first alignment layer 112 which corresponds to the auxiliary photo spacers, thereby further improve the problem of scratching the first alignment layer 112 by the offset photo spacers 300, and further reducing the probability of the first alignment layer 112 to generate grouped dark gray spots.

In some embodiments of the present application, the light shielding layer 202 may be disposed on the first substrate 100 or the second substrate 200. Optionally, the first substrate 100 is an array substrate, the second substrate 200 is a color film substrate, and the first alignment layer 112 is disposed on the array substrate.

In some embodiments of the present application, the distance between the first portion 1121 and the second substrate 200 is less than the distance between the second portion 1122 and the second substrate 200.

In the display panel provided in the present application, since the distance between the first portion 1121 and the second substrate 200 is smaller than the distance between the second portion 1122 and the second substrate 200, the length of the photo spacer 300 corresponding to the first portion 1121 can be further shortened. So, the offset distance of the photo spacer 300 having a shorter length can be correspondingly shortened when the photo spacer 300 having a shorter length is offset by the same degree of inclination under the same external force, compared with the photo spacer 300 having a longer length. Thus, the scratched area of the first alignment layer 112 is reduced, and the setting area of the light shielding layer 202 can be further reduced, so that the area of the apertures 2021 of the light shielding layer 202 can be larger, and the aperture ratio of the display panel is further improved.

In some embodiments of the present application, the first substrate 100 includes a plurality of metal layers disposed between the first base 101 and the first alignment layer 112. A metal layer of the plurality of metal layers which is closest to the first alignment layer 112 is a first metal layer 109. The first metal layer 109 overlaps the first portion 1121 and does not overlap the second portion 1122 in a direction perpendicular to the first base 101.

In the display panel provided in the present application, since the first metal layer 109 overlaps the first portion 1121 and does not overlap the second portion 1122 in a direction perpendicular to the first base 101, that is, a thickness of a region, which is corresponding to the second portion 1122, of the first metal layer 109 is 0, the first metal layer 109 is of a boss structure provided in correspondence with the first portion 1121. By forming the first metal layer 109 having the boss structure, the present application can make the height of the first portion 1121 provided on a side of the first metal layer 109 which is away from the first base 101 larger than the height of the second portion 1122, so that the distance between the first portion 1121 and the second substrate 200 is smaller than the distance between the second portion 1122 and the second substrate 200, thereby achieving the purpose of improving the aperture ratio of the display panel. Further, since the first metal layer 109 is made of a metal, such as a metal (such as copper, molybdenum, aluminum, or titanium) or an alloy each having a high hardness, the photo spacer 300 can be well supported, and the offset possibility of the photo spacer 300 under an external force is further reduced.

Figure 3:
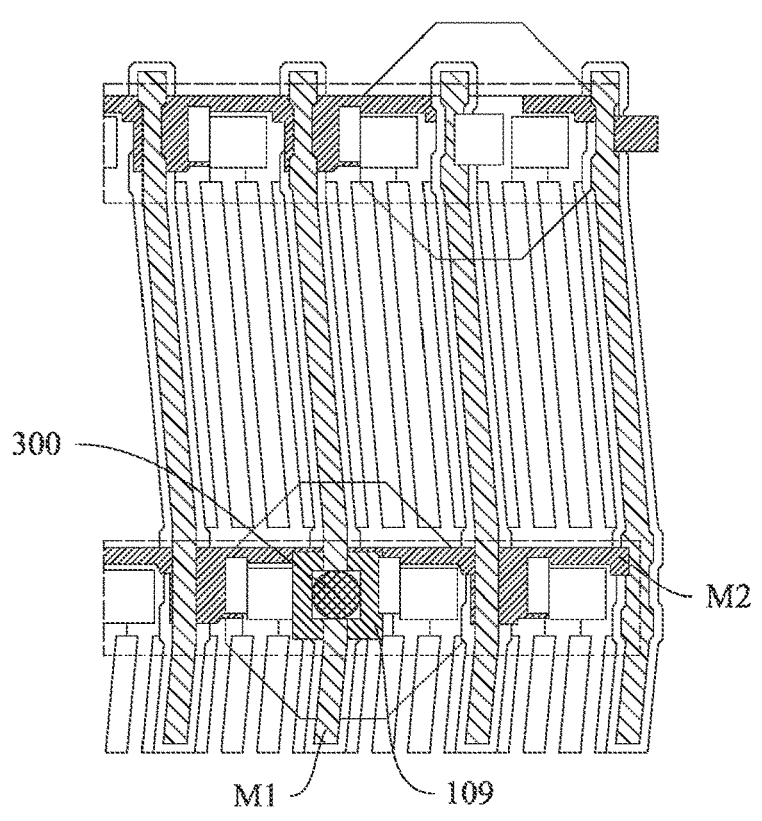
FIG. 3 is a schematic plan view of a display panel according to Example 1 of the present application.

FIG. 3 is a schematic plan view of a display panel according to Example 1 of the present application. Referring to FIG. 3, in some embodiments of the present application, the display panel includes data lines M1 and scan lines M2, and the first metal layer 109 is disposed on an intersection region of an extension line of the data line M1 and an extension line of the scan line M2.

In the display panel provided in the present application, since the first metal layer 109 is provided on the intersection region of the extension line of the data line M1 and the extension line of the scan line M2, the arrangement of the first metal layer 109 does not cause the aperture ratio of the display panel to decrease. Alternatively, the data lines M1 and the scan lines M2 are disposed in the plurality of metal layers and are disposed differently from the first metal layer 109.

In some embodiments of the present application, the orthographic projection of the light shielding layer 202 on the first substrate 100 covers the orthographic projection of the first portion 1121 on the first substrate 100 and the orthographic projection of the first metal layer 109 on the first substrate 100.

In the display panel provided in the present application, since the orthographic projection of the light shielding layer 202 on the first substrate 100 covers the orthographic projection of the first portion 1121 on the first substrate 100, a surface state of the first portion 1121 does not affect the aperture ratio of the display panel. Further, since the orthographic projection of the light shielding layer 202 on the first substrate 100 covers the orthographic projection of the first metal layer 109 on the first substrate 100, the arrangement of the first metal layer 109 does not cause the aperture ratio of the display panel to decrease.

In some embodiments of the present application, a distance between the photo spacer 300 and an edge of the first portion 1121 is greater than zero.

In the display panel provided in the present application, since the distance between the photo spacer 300 and the edge of the first portion 1121 is greater than 0, an offset range of the photo spacer 300 under the external force is increased, so that the stability of the display panel is enhanced.

In some embodiments of the present application, the display panel further includes a first passivation layer 110 disposed between the first metal layer 109 and the first alignment layer 112. The first passivation layer 110 is continuously disposed in a region corresponding to both the first portion 1121 and the second portion 1122 without the presence of an opening structure. In the direction perpendicular to the first base 101, a distance between a portion of the first passivation layer 110 which overlaps the first metal layer 109 and the first base 101 is greater than a distance between a portion of the first passivation layer 110 which does not overlap the first metal layer 109. That is, the first metal layer 109 causes the first passivation layer 110 to likewise have a boss structure. The first portion 1121 is disposed directly above the boss structure in the first passivation layer 110.

In some embodiments of the present application, the display panel further includes a pixel electrode layer 111 that is a metal oxide conductive thin film, which may be, for example, indium tin oxide. Alternatively, the pixel electrode layer 111 includes a plurality of comb-shaped electrodes with gaps between two adjacent comb-shaped electrodes. The first metal layer 109 and the boss structure in the first passivation layer 110 are located in the gap between two adjacent comb-shaped electrodes. Further, the first metal layer 109, and the boss structure in the first passivation layer 110 are located between a first comb-shaped electrode at the outermost edge and a second comb-shaped electrode.

In some embodiments of the present application, the first substrate 100 further includes a gate metal layer 102, a gate insulating layer 103, an active layer 104, a source-drain metal layer 105, a first insulating layer 106, a protective layer 107, and a common electrode layer 108 stacked sequentially on the first base 101. The first metal layer 109 is disposed on a surface of a side of the common electrode layer 108 which deviates from the first base 101, and electrically connected to the common electrode layer 108. The gate metal layer 102 includes a gate. The active layer 104 includes a channel. The source-drain metal layer 105 includes a source-drain electrode, and the gate, the channel, and the source-drain electrode constitute a thin film transistor. The light-shielding layer 202 covers the thin film transistor, and the first metal layer 109 is disposed adjacent to the thin film transistor so as to further reduce the setting area of the light-shielding layer 202 and increase the aperture ratio of the display panel. Alternatively, the material of the active layer 104 is a metal oxide semiconductor material.

In some embodiments of the present application, the display panel further includes a liquid crystal layer 400 disposed between the first substrate 100 and the second substrate 200.

In some embodiments of the present application, the second substrate 200 includes a second base 201, a color film layer 203 and a second alignment layer 204 which are disposed on one side of the second base 201 which faces towards the first substrate 100. The color film layer 203 includes a plurality of color film units disposed within apertures 2021 of the light shielding layer 202. Of course, the placement of the color film layer 203 is not limited in the present application. In other embodiments of the present application, the color film layer 203 may be disposed in the first substrate 100.

According to a second aspect, an embodiment of the present application further provides a display device including a housing and a display panel according to any one of the above. The housing has an accommodating space in which the display panel is disposed.

Example 2

Figure 4:
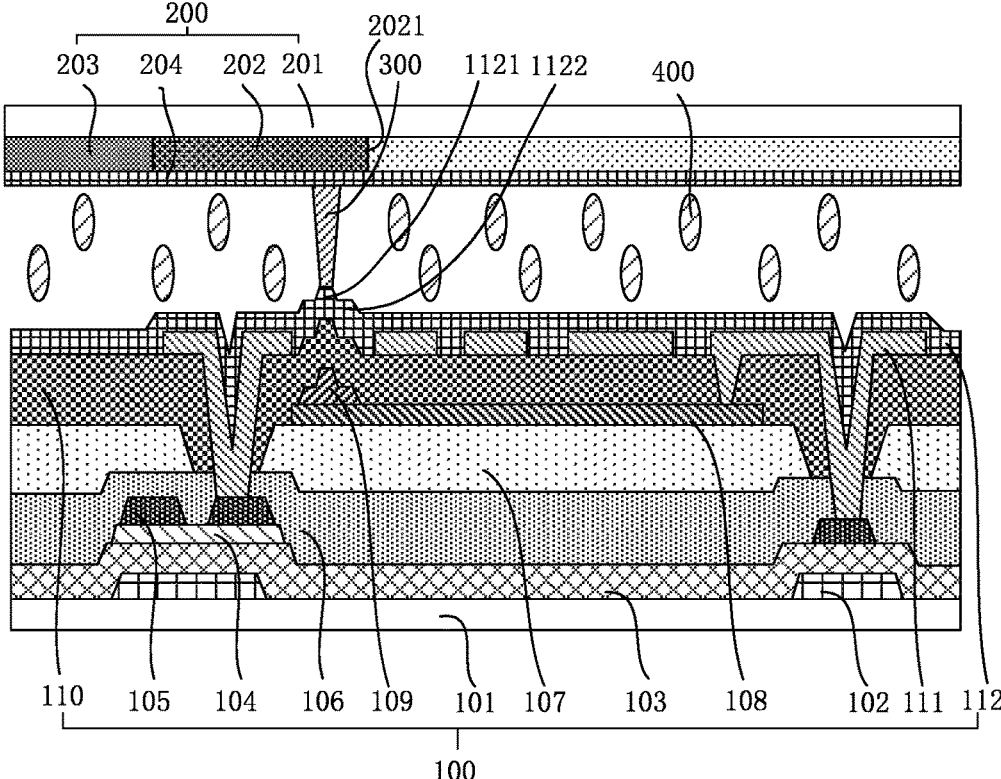
FIG. 4 is a schematic sectional view of a display panel according to Example 2 of the present application.

FIG. 4 is a schematic cross-sectional view of a photo spacer without offset in a display panel according to Example 2 of the present application. Referring to FIG. 4, Example 2 of the present application provides a display panel including a first substrate 100, a second substrate 200, and a photo spacer 300 disposed between the first substrate 100 and the second substrate 200. The first substrate 100 and/or the second substrate 200 include a light shielding layer 202 having a plurality of apertures 2021, and an orthographic projection of the light shielding layer 202 on the first substrate 100 covers at least a portion of the orthographic projection of the photo spacer 300 on the first substrate 100. The first substrate 100 includes a first base 101 and a first alignment layer 112. The first alignment layer 112 is disposed on one side of the first base 101 which faces toward the second substrate 200. The first alignment layer 112 includes a first portion 1121 and a second portion 1122. The second portion 1122 surrounds the first portion 1121. One end of the photo spacer 300 is connected to the second substrate 200, and the other end of the photo spacer 300 corresponds to the first portion 1121. The distance between the first portion 1121 and the second substrate 200 is different from the distance between the second portion 1122 and the second substrate 200.

It should be noted that the structure of the display panel provided in Example 2 of the present application is similar to that of the display panel provided in Example 1 of the present application. For example, if the distance between the first portion 1121 and the second substrate 200 is smaller than the distance between the second portion 1122 and the second substrate 200, details of the same portions are not described in Example 2 of the present application.

In some embodiments of the present application, the first substrate 100 includes a plurality of metal layers disposed between the first base 101 and the first alignment layer 112.

A metal layer of the plurality of metal layers which is closest to the first alignment layer 112 is a first metal layer 109. The first metal layer 109 overlaps the first portion 1121 and the second portion 1122 in a direction perpendicular to the first base 101, and a thickness of a portion of the first metal layer 109 which is overlapped with the first portion 1121 is greater than a thickness of a portion of the first metal layer 109 which is overlapped with the second portion 1122.

In the display panel provided by the present application, since the first metal layer 109 overlaps the first portion 1121 and the second portion 1122 in the direction perpendicular to the first base 101, and the thickness of the portion of the first metal layer 109 which is overlapped with the first portion 1121 is greater than the thickness of the portion of the first metal layer 109 which is overlapped with the second portion 1122, that is, a thickness of a region of the first metal layer 109 which corresponds to the first portion 1121 is greater than a thickness of a region of the first metal layer 109 which corresponds to the second portion 1122, the first metal layer 109 forms a step structure with a high middle portion and a low circumferential side. By forming the first metal layer 109 having the step structure with the high middle portion and the low circumferential side, the present application can make the height of the first portion 1121 provided on the side of the first metal layer 109 which is away from the first base 101 to be larger than the height of the second portion 1122, so that the distance between the first portion 1121 and the first base 101 is greater than the distance between the second portion 1122 and the first base 101. The purpose of improving the aperture ratio of the display panel is achieved. Further, since the first metal layer 109 is made of a metal, such as a metal (such as copper, molybdenum, aluminum, or titanium) or an alloy each having a high hardness, the photo spacer 300 can be well supported, and the offset possibility of the photo spacer 300 under an external force is further reduced.

In addition, since a region of the display panel which is corresponding to the second portion 1122 is also provided with the first metal layer 109, the setting area of the first metal layer 109 is increased. So, the support capability of the first metal layer 109 is stronger compared with Example 1, thereby further reducing the probability that the photo spacer 300 is offset under an external force.

According to a second aspect, Example 2 of the present application further provides a display device including a housing and a display panel according to any one of the above. The housing has an accommodating space in which the display panel is disposed.

Example 3

Figure 5:
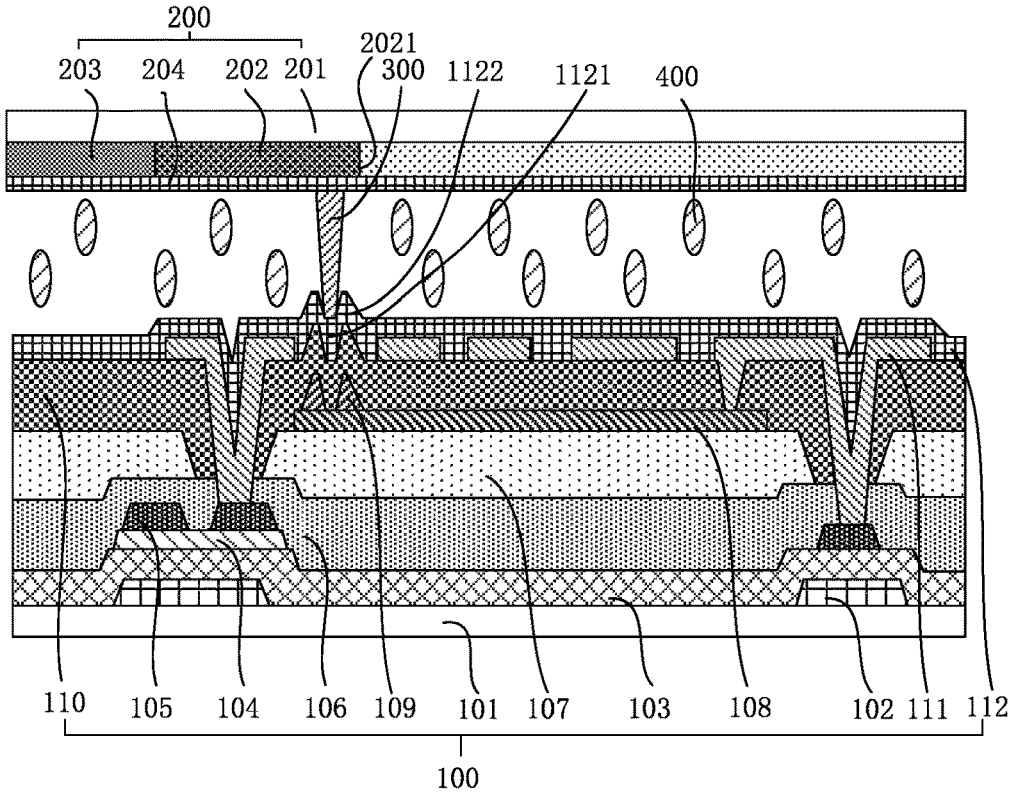
FIG. 5 is a schematic sectional view of a display panel according to Example 3 of the present application.

FIG. 5 is a schematic cross-sectional view of a photo spacer without offset in a display panel according to Example 3 of the present application. As shown in FIG. 5, Example 3 of the present application provides a display panel including a first substrate 100, a second substrate 200, and a photo spacer 300 disposed between the first substrate 100 and the second substrate 200. The first substrate 100 and/or the second substrate 200 include a light shielding layer 202 having a plurality of apertures 2021, and an orthographic projection of the light shielding layer 202 on the first substrate 100 covers at least a portion of the orthographic projection of the photo spacer 300 on the first substrate 100. The first substrate 100 includes a first base 101 and a first alignment layer 112. The first alignment layer 112 is disposed on one side of the first base 101 which faces toward the second substrate 200. The first alignment layer 112 includes a first portion 1121 and a second portion 1122. The second portion 1122 surrounds the first portion 1121. One end of the photo spacer 300 is connected to the second substrate 200, and the other end of the photo spacer 300 corresponds to the first portion 1121. The distance between the first portion 1121 and the second substrate 200 is different from the distance between the second portion 1122 and the second substrate 200.

It should be noted that the structure of the display panel provided in Example 3 of the present application is similar to that of the display panel provided in Example 1 of the present application, and details of the same parts are not described in Example 3 of the present application.

In some embodiments of the present application, the distance between the first portion 1121 and the second substrate 200 is greater than the distance between the second portion 1122 and the second substrate 200.

In the display panel provided in the present application, since the distance between the first portion 1121 and the second substrate 200 is greater than the distance between the second portion 1122 and the second substrate 200, the first portion 1121 and the second portion 1122 form an internally concave and externally convex groove structure. When the display panel is subjected to an external force, the first photo spacers 300 in contact with the first portions 1121 can be snapped into the respective groove structures, thereby further reducing the probability that the photo spacers 300 are offset, reducing the scratched area of the first alignment layer 112, further enabling the setting area of the light shielding layer 202 to be further reduced, enabling the area of the apertures 2021 of the light shielding layer 202 to be larger, and further improving the aperture ratio of the display panel.

In some embodiments of the present application, the first substrate 100 includes a plurality of metal layers disposed between the first base 101 and the first alignment layer 112. A metal layer of the plurality of metal layers which is closest to the first alignment layer 112 is a first metal layer 109. The first metal layer 109 overlaps the second portion 1122 and does not overlap the first portion 1121 in a direction perpendicular to the first base 101.

In the display panel provided in the present application, since the first metal layer 109 overlaps with the second portion 1122 and does not overlap with the first portion 1121 in a direction perpendicular to the first base 101, the first metal layer 109 forms an internally concave and externally convex groove structure, so that the first portion 1121 and the second portion 1122 form an internally concave and externally convex groove structure. When the display panel is subjected to an external force, the photo spacers 300 in contact with the first portions 1121 can be snapped into the respective groove structures formed by the first portions 1121 and the second portions 1122, thereby achieving the purpose of reducing the probability that the photo spacers 300 are offset.

According to a second aspect, Example 3 of the present application further provides a display device including a housing and a display panel according to any one of the above. The housing has an accommodating space in which the display panel is disposed.

Example 4

Figure 6:
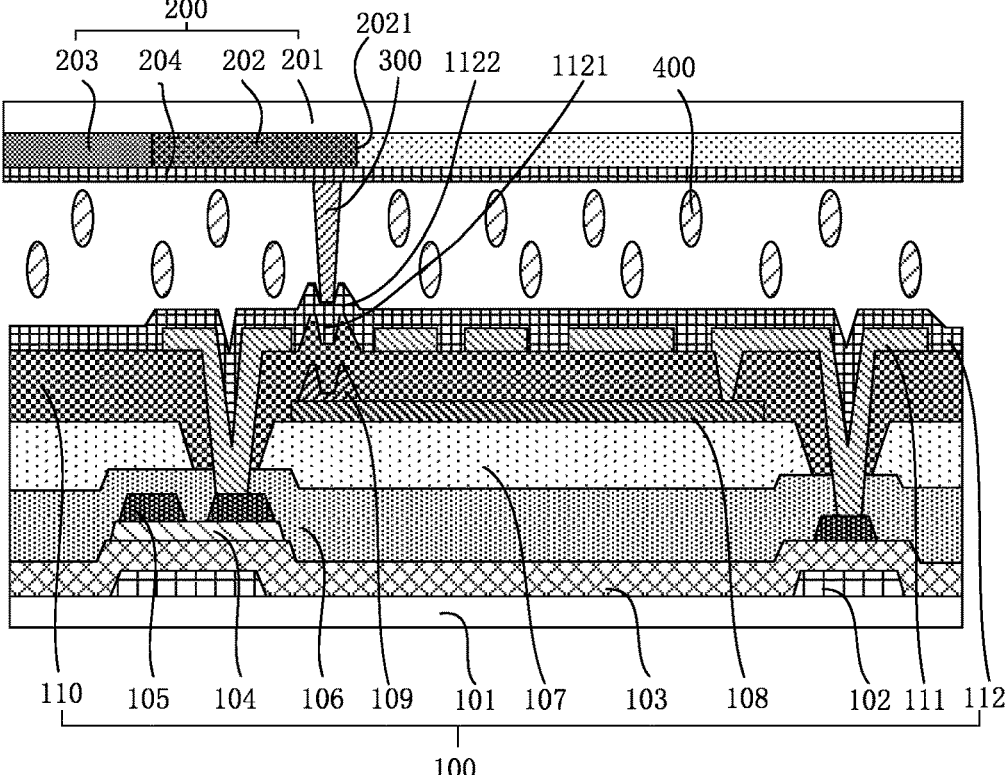
FIG. 6 is a schematic sectional view of a display panel according to Example 4 of the present application.

FIG. 6 is a schematic cross-sectional view of a photo spacer without offset in a display panel according to Example 4 of the present application. Referring to FIG. 6, Example 4 of the present application provides a display panel including a first substrate 100, a second substrate 200, and a photo spacer 300 disposed between the first substrate 100 and the second substrate 200. The first substrate 100 and/or the second substrate 200 include a light shielding layer 202 having a plurality of openings 2021, and an orthographic projection of the light shielding layer 202 on the first substrate 100 covers at least a portion of the orthographic projection of the photo spacer 300 on the first substrate 100. The first substrate 100 includes a first base 101 and a first alignment layer 112. The first alignment layer 112 is disposed on one side of the first base 101 which faces toward the second substrate 200. The first alignment layer 112 includes a first portion 1121 and a second portion 1122. The second portion 1122 surrounds the first portion 1121. One end of the photo spacer 300 is connected to the second substrate 200, and the other end of the photo spacer 300 corresponds to the first portion 1121. The distance between the first portion 1121 and the second substrate 200 is different from the distance between the second portion 1122 and the second substrate 200.

It should be noted that the structure of the display panel provided in Example 4 of the present application is similar to that of the display panel provided in Example 3 of the present application. For example, if the distance between the first portion 1121 and the second substrate 200 is greater than the distance between the second portion 1122 and the second substrate 200, details of the same portions are not described in Example 4 of the present application.

In some embodiments of the present application, the first substrate 100 includes a plurality of metal layers disposed between the first base 101 and the first alignment layer 112. A metal layer of the plurality of metal layers which is closest to the first alignment layer 112 is a first metal layer 109. In a direction perpendicular to the first base 101, the first metal layer 109 overlaps the first portion 1121 and the second portion 1122, and a thickness of a portion of the first metal layer 109 which is overlapped with the first portion 1121 is less than a thickness of a portion of the first metal layer 109 which is overlapped with the second portion 1122.

In the display panel provided in the present application, since the first metal layer 109 overlaps the first portion 1121 and the second portion 1122 in a direction perpendicular to the first base 101, and the thickness of the portion of the first metal layer 109 which is overlapped with the first portion 1121 is less than the thickness of the portion of the first metal layer 109 which is overlapped with the second portion 1122, the first metal layer 109 forms an internally concave and externally convex groove structure, so that the first portion 1121 and the second portion 1122 form an internally concave and externally convex groove structure. When the display panel is subjected to an external force, the first photo spacers 300 in contact with the first portions 1121 can be snapped into the respective groove structures formed by the first portions 1121 and the second portions 1122, thereby achieving the purpose of reducing the probability that the photo spacers 300 are offset.

Further, since the portion of the first metal layer 109 which corresponds to the first portion 1121 has a certain thickness, the length of the photo spacer 300 can be shortened compared with Example 3. The offset distance of the photo spacer 300 having a shorter length can be correspondingly shortened when the photo spacer 300 having a shorter length is offset by the same degree of inclination under the same external force, compared with the photo spacer 300 having a longer length. Thus, the scratched area of the first alignment layer 112 is reduced, and the setting area of the light shielding layer 202 can be further reduced, so that the area of the apertures 2021 of the light shielding layer 202 can be larger, and the aperture ratio of the display panel is further improved.

In addition, since the portion of the first metal layer 109 which corresponds to the first portion 1121 has a certain thickness, the photo spacer 300 can be supported by the first metal layer 109, thereby further reducing the offset probability of the photo spacer 300.

According to a second aspect, Example 4 of the present application further provides a display device including a housing and a display panel according to any one of the above. The housing has an accommodating space in which the display panel is disposed.

Example 5

Figure 7:
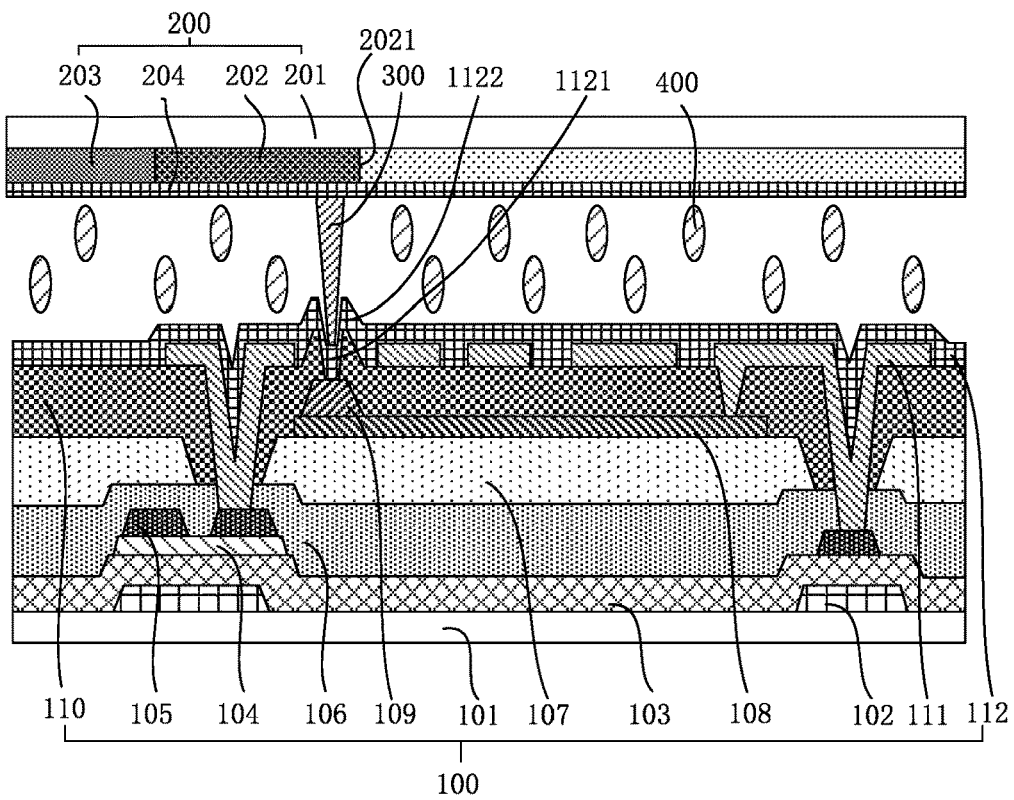
FIG. 7 is a schematic sectional view of a display panel according to Example 5 of the present application.

FIG. 7 is a schematic cross-sectional view of a photo spacer without offset in a display panel according to Example 5 of the present application. Referring to FIG. 7, Example 5 of the present application provides a display panel including a first substrate 100, a second substrate 200, and a photo spacer 300 disposed between the first substrate 100 and the second substrate 200. The first substrate 100 and/or the second substrate 200 include a light shielding layer 202 having a plurality of apertures 2021, and an orthographic projection of the light shielding layer 202 on the first substrate 100 covers at least a portion of the orthographic projection of the photo spacer 300 on the first substrate 100. The first substrate 100 includes a first base 101 and a first alignment layer 112. The first alignment layer 112 is disposed on one side of the first base 101 which faces toward the second substrate 200. The first alignment layer 112 includes a first portion 1121 and a second portion 1122. The second portion 1122 surrounds the first portion 1121. One end of the photo spacer 300 is connected to the second substrate 200, and the other end of the photo spacer 300 corresponds to the first portion 1121. The distance between the first portion 1121 and the second substrate 200 is different from the distance between the second portion 1122 and the second substrate 200.

It should be noted that the structure of the display panel provided in Example 5 of the present application is similar to that of the display panel provided in Example 3 of the present application. For example, if the distance between the first portion 1121 and the second substrate 200 is greater than the distance between the second portion 1122 and the second substrate 200, details of the same portions are not described in Example 5 of the present application.

In some embodiments of the present application, the first substrate 100 includes a plurality of metal layers disposed between the first base 101 and the first alignment layer 112, a metal layer of the plurality of metal layers which is closest to the first alignment layer 112 is a first metal layer 109. The first metal layer 109 overlaps the first portion 1121 and the second portion 1122. A thickness of a portion of the first metal layer 109 which is overlapped with the first portion 1121 is equal to a thickness of a portion of the first metal layer 109 which is overlapped with the second portion 1122. A first passivation layer 110 is disposed between the first metal layer 109 and the alignment layer. The first passivation layer 110 overlaps the second portion 1122 and does not overlap the first portion 1121 in a direction perpendicular to the first base 101.

In the display panel provided in the present application, since the first passivation layer 110 overlaps with the second portion 1122 and does not overlap with the first portion 1121 in the direction perpendicular to the first base 101, the first passivation layer 110 forms an internally concave and externally convex groove structure, so that the first portion 1121 and the second portion 1122 form an internally concave and externally convex groove structure. When the display panel is subjected to an external force, the first photo spacers 300 in contact with the first portions 1121 can be snapped into the respective groove structures formed by the first portions 1121 and the second portions 1122, thereby achieving the purpose of reducing the offset probability of the photo spacers 300.

In addition, since the thickness of the portion of the first metal layer 109 which corresponds to the first portion 1121 is the same as the thickness of the portion of the first metal layer 109 which corresponds to the second portion 1122, it is possible to reduce the difficulty in film formation of the first metal layer 109 and make the thickness of the first metal layer 109 larger, thereby improving the supporting performance of the first metal layer 109 to the photo spacer 300 and further reducing the offset probability of the photo spacer 300.

According to a second aspect, Example 5 of the present application further provides a display device including a housing and a display panel according to any one of the above. The housing has an accommodating space in which the display panel is disposed.

Example 6

Figure 8:
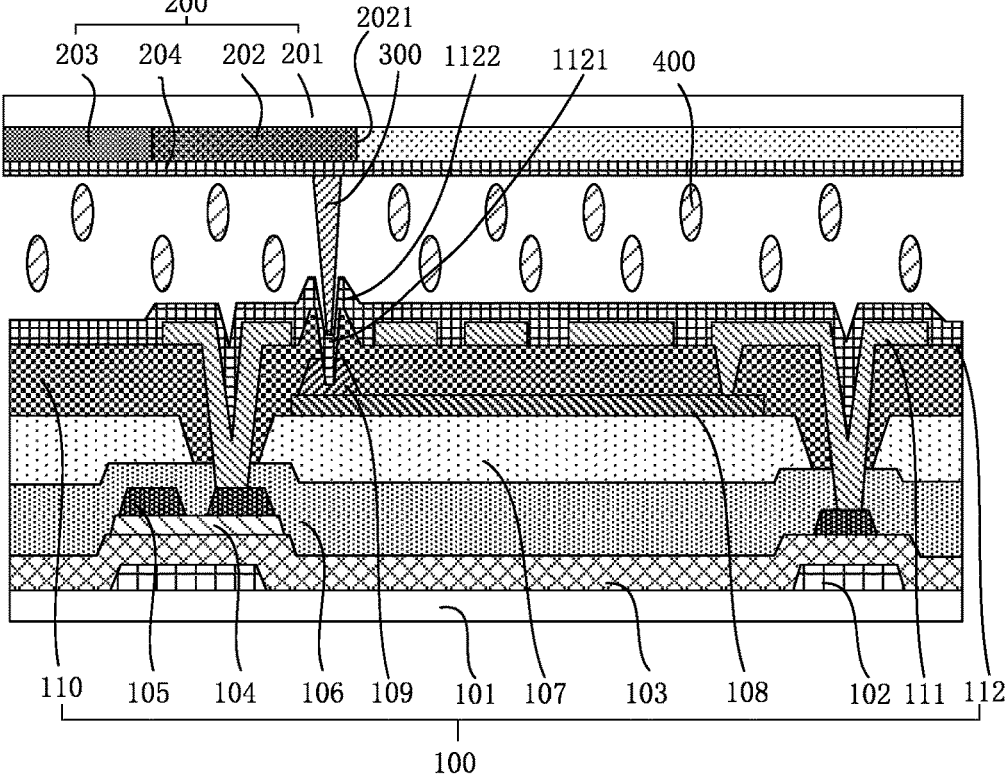
FIG. 8 is a schematic cross-sectional view of a display panel according to Example 6 of the present application.

FIG. 8 is a schematic cross-sectional view of a photo spacer without offset in a display panel according to Example 6 of the present application. Referring to FIG. 8, Example 6 of the present application provides a display panel including a first substrate 100, a second substrate 200, and a photo spacer 300 disposed between the first substrate 100 and the second substrate 200. The first substrate 100 and/or the second substrate 200 include a light shielding layer 202 having a plurality of apertures 2021, and an orthographic projection of the light shielding layer 202 on the first substrate 100 covers at least a portion of the orthographic projection of the photo spacer 300 on the first substrate 100. The first substrate 100 includes a first base 101 and a first alignment layer 112. The first alignment is disposed on one side of the first base 101 which faces toward the second substrate 200. The first alignment layer 112 includes a first portion 1121 and a second portion 1122. The second portion 1122 surrounds the first portion 1121. One end of the photo spacer 300 is connected to the second substrate 200, and the other end of the photo spacer 300 corresponds to the first portion 1121. The distance between the first portion 1121 and the second substrate 200 is different from the distance between the second portion 1122 and the second substrate 200.

It should be noted that the structure of the display panel provided in Example 6 of the present application is similar to that of the display panel provided in Example 5 of the present application. For example, if the distance between the first portion 1121 and the second substrate 200 is greater than the distance between the second portion 1122 and the first base 101, the same parts will not be described in Example 6 of the present application.

In some embodiments of the present application, the first substrate 100 includes a plurality of metal layers disposed between the first base 101 and the first alignment layer 112. A metal layer of the plurality of metal layers which is closest to the first alignment layer 112 is a first metal layer 109. In a direction perpendicular to the first base 101, the first metal layer 109 overlaps the first portion 1121 and the second portion 1122, and a thickness of a portion of the first metal layer 109 which is overlapped with the first portion 1121 is less than a thickness of a portion of the first metal layer 109 which is overlapped with the second portion 1122. A first passivation layer 110 is provided between the first metal layer 109 and the alignment layer. In a direction perpendicular to the first base 101, the first passivation layer 110 overlaps the second portion 1122 and does not overlap the first portion 1121.

In the display panel provided in the present application, since in the direction perpendicular to the first base 101, the thickness of the portion of the first metal layer 109 which is overlapped with the first portion 1121 is smaller than the thickness of the portion of the first metal layer 109 which is overlapped with the second portion 1122, and the first passivation layer 110 overlaps with the second portion 1122 and does not overlap with the first portion 1121, the first metal layer 109 and the first passivation layer 110 both form an internally concave and externally convex groove structure. So, the first portion 1121 and the second portion 1122 form an internally concave and externally convex groove structure with a larger segment difference. When the display panel is subjected to an external force, the first photo spacers 300 in contact with the first portions 1121 can be better snapped into the respective groove structures formed by the first portions 1121 and the second portions 1122, thereby achieving the purpose of further reducing the possibility that the photo spacers 300 are offset.

According to a second aspect, Example 6 of the present application further provides a display device including a housing and a display panel according to any one of the above. The housing has an accommodating space in which the display panel is disposed.

Example 7

Figure 9:
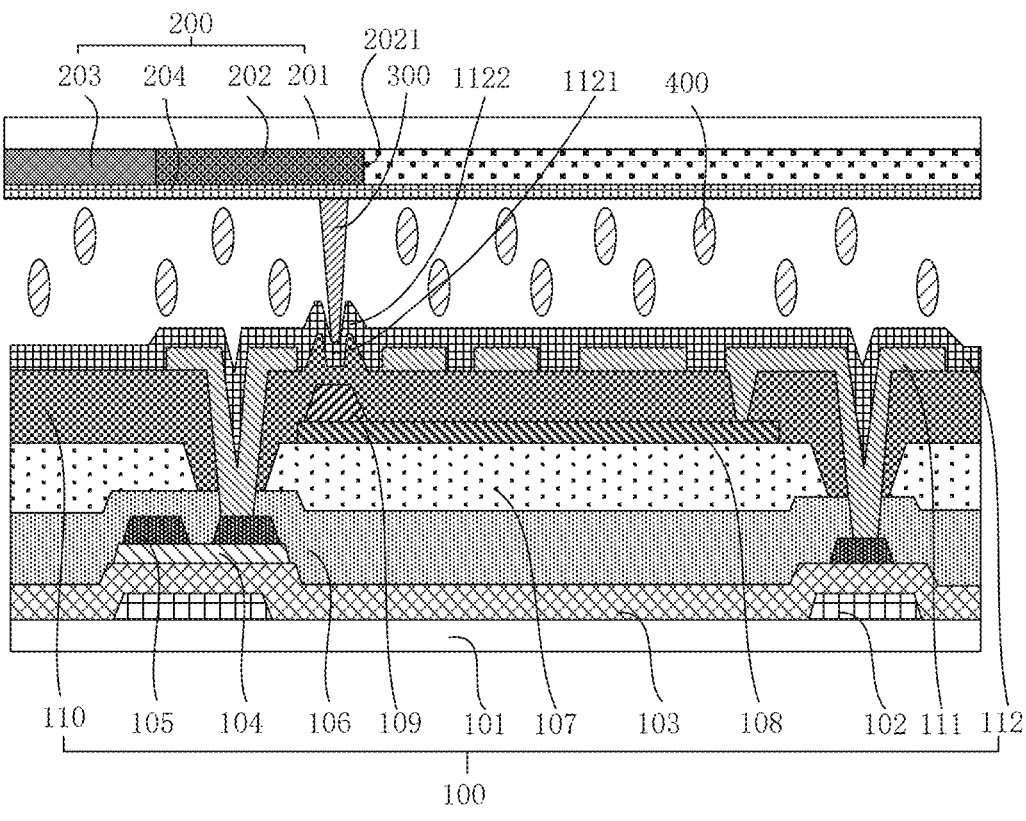
FIG. 9 is a schematic cross-sectional view of a display panel according to Example 7 of the present application

FIG. 9 is a schematic cross-sectional view of a photo spacer without offset in a display panel according to Example 7 of the present application. As shown in FIG. 9, Example 7 of the present application provides a display panel including a first substrate 100, a second substrate 200, and a photo spacer 300 disposed between the first substrate 100 and the second substrate 200. The first substrate 100 and/or the second substrate 200 include a light shielding layer 202 having a plurality of apertures 2021. An orthographic projection of the light shielding layer 202 on the first substrate 100 covers at least a portion of the orthographic projection of the photo spacer 300 on the first substrate 100. The first substrate 100 includes a first base 101 and a first alignment layer 112. The first alignment layer 112 is disposed on one side of the first base 101 which faces toward the second substrate 200. The first alignment layer 112 includes a first portion 1121 and a second portion 1122. The second portion 1122 surrounds the first portion 1121. One end of the photo spacer 300 is connected to the second substrate 200, and the other end of the photo spacer 300 corresponds to the first portion 1121. The distance between the first portion 1121 and the second substrate 200 is different from the distance between the second portion 1122 and the second substrate 200.

It should be noted that the structure of the display panel provided in Example 7 of the present application is similar to that of the display panel provided in Example 5 of the present application. For example, if the distance between the first portion 1121 and the second substrate 200 is greater than the distance between the second portion 1122 and the first base 101, the same parts will not be described in Example 7 of the present application.

In some embodiments of the present application, the first substrate 100 includes a plurality of metal layers disposed between the first base 101 and the first alignment layer 112. A metal layer of the plurality of metal layers which is closest to the first alignment layer 112 is a first metal layer 109. The first metal layer 109 overlaps the first portion 1121 and the second portion 1122. A thickness of a portion of the first metal layer 109 which is overlapped with the first portion 1121 is equal to a thickness of a portion of the first metal layer 109 which is overlapped with the second portion 1122. A first passivation layer 110 is disposed between the first metal layer 109 and the alignment layer. The first passivation layer 110 overlaps the first portion 1121 and the second portion 1122 in a direction perpendicular to the first base 101. A thickness of a portion of the first passivation layer 110 which is overlapped with the first portion 1121 is less than a thickness of a portion of the first passivation layer 110 which is overlapped with the second portion 1122.

In the display panel provided in the present application, since the first passivation layer 110 overlaps the first portion 1121 and the second portion 1122 in a direction perpendicular to the first base 101, and the thickness of the portion of the first passivation layer 110 which is overlapped with the first portion 1121 is smaller than the thickness of the portion of the first passivation layer 110 which is overlapped with the second portion 1122, the first passivation layer 110 forms an internally concave and externally convex groove structure, so that the first portion 1121 and the second portion 1122 form an internally concave and externally convex groove structure. When the display panel is subjected to an external force, the first photo spacers 300 in contact with the first portions 1121 can be snapped into the respective groove structures formed by the first portions 1121 and the second portions 1122, thereby achieving the purpose of reducing the probability that the photo spacers 300 are offset.

Further, since a portion of the first passivation layer 110 which corresponds to the first portion 1121 has a certain thickness, the depth of the groove structure in the first passivation layer 110 can be reduced, and the length of the photo spacer 300 can be shortened, compared with Example 5. The offset distance of the photo spacer 300 having the shorter length can be correspondingly shortened when the photo spacer 300 having the shorter length is offset by the same degree of inclination under the same external force. Thus, the scratched area of the first alignment layer 112 is reduced, and the setting area of the light shielding layer 202 can be further reduced, so that the area of the apertures 2021 of the light shielding layer 202 can be larger, and the aperture ratio of the display panel is further improved.

According to a second aspect, Example 7 of the present application further provides a display device including a housing and a display panel according to any one of the above. The housing has an accommodating space in which the display panel is disposed.

Figure 10:
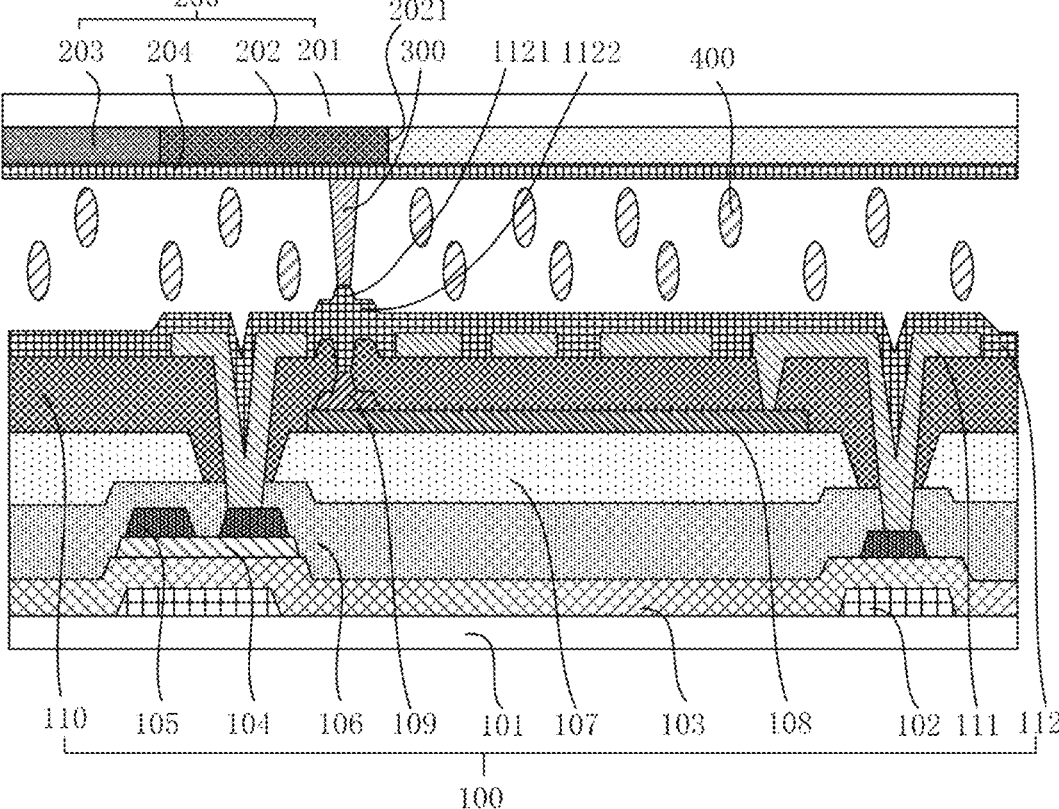
FIG. 10 is another schematic cross-sectional view of a display panel according to embodiments of the present application.

As shown in FIG. 10, in a direction perpendicular to the first base 101, the first metal layer 109 overlaps the first portion 1121 and the second portion 1122, and a thickness of a portion of the first metal layer 109 which is overlapped with the first portion 1121 is greater than a thickness of a portion of the first metal layer 109 which is overlapped with the second portion 1122. The first passivation layer 110 overlaps the second portion 1122 and does not overlap the first portion 1121 in the direction perpendicular to the first base 101.

In summary, the present application provides a display panel including a first substrate, a second substrate, and a photo spacer disposed between the first substrate and the second substrate. The first substrate and/or the second substrate include a light shielding layer. The light shielding layer has a plurality of apertures. An orthographic projection of the light shielding layer on the first substrate overlaps at least a portion of the orthographic projection of the photo spacer on the first substrate. The first substrate includes a first base and a first alignment layer. The first alignment layer is disposed on one side of the first substrate which faces toward the second substrate. The first alignment layer includes a first portion and a second portion. The second portion surrounds the first portion. One end of the photo spacer is connected to the second substrate, and the other end of the photo spacer corresponds to the first portion. The distance between the first portion and the second substrate is different from the distance between the second portion and the second substrate. According to the present application, the problem of scratching the first alignment layer by the offset photo spacers is improved, so that the probability of generating grouped dark gray spots in the first alignment layer is greatly reduced, the display quality of the display panel is improved, the setting area of the light shielding layer is reduced, the aperture area of the light shielding layer can be set larger, and the aperture ratio of the display panel is improved.

The foregoing describes in detail a display panel and a display device according to an embodiment of the present application, and the principles and embodiments of the present application are described herein using specific examples. The description of the above embodiments is merely provided to help understand the method of the present application and the core idea thereof. At the same time, variations will occur to those skilled in the art in both the detailed description and the scope of application in accordance with the teachings of the present application. In view of the foregoing, the present description should not be construed as limiting the application.

What is claimed is:

1. A display panel comprising: a first substrate, a second substrate, and a photo spacer disposed between the first substrate and the second substrate, the first substrate and/or the second substrate comprising a light shielding layer having a plurality of apertures, and an orthographic projection of the light shielding layer on the first substrate covering at least a portion of an orthographic projection of the photo spacer on the first substrate;

wherein the first substrate comprises a first base and a first alignment layer disposed on one side of the first substrate which faces towards the second substrate, the first alignment layer comprises a first portion and a second portion, the second portion surrounds around the first portion, one end of the photo spacer is connected to the second substrate, an other end of the photo spacer corresponds to the first portion, and a distance between the first portion and the second substrate is different from a distance between the second portion and the second substrate;

wherein the first substrate comprises a plurality of metal layers disposed between the first base and the first alignment layer, and one of the plurality of metal layers which is closest to the first alignment layer is a first metal layer, wherein the first metal layer overlaps the first portion and the second portion in a direction perpendicular to the first base;

wherein a distance between the first portion and the second substrate is less than a distance between the second portion and the second substrate;

in the direction perpendicular to the first base, a thickness of a portion of the first metal layer which is overlapped with the first portion is greater than a thickness of a portion of the first metal layer which is overlapped with the second portion.

2. The display panel according to claim 1, wherein the orthographic projection of the light shielding layer on the first substrate covers an orthographic projection of the first portion on the first substrate.

3. The display panel according to claim 1, wherein the first metal layer is provided on an intersection region of an extension line of a data line and an extension line of a scan line, and/or the orthographic projection of the light shielding layer on the first substrate covers an orthographic projection of the first metal layer on the first substrate.

4. A display panel, comprising: a first substrate, a second substrate, and a photo spacer disposed between the first substrate and the second substrate, the first substrate and/or the second substrate comprising a light shielding layer having a plurality of apertures, and an orthographic projection of the light shielding layer on the first substrate covering at least a portion of an orthographic projection of the photo spacer on the first substrate;

wherein the first substrate comprises a first base and a first alignment layer disposed on one side of the first substrate which faces towards the second substrate, the first alignment layer comprises a first portion and a second portion, the second portion surrounds around the first portion, one end of the photo spacer is connected to the second substrate, an other end of the photo spacer corresponds to the first portion, and a distance between the first portion and the second substrate is different from a distance between the second portion and the second substrate;

wherein the first substrate comprises a plurality of metal layers disposed between the first base and the first alignment layer, and one of the plurality of metal layers which is closest to the first alignment layer is a first metal layer, wherein the first metal layer overlaps the first portion and the second portion in a direction perpendicular to the first base;

wherein a distance between the first portion and the second substrate is greater than a distance between the second portion and the second substrate.

5. The display panel according to claim 4, wherein in the direction perpendicular to the first base, a thickness of a portion of the first metal layer which is overlapped with the first portion is smaller than a thickness of a portion of the first metal layer which is overlapped with the second portion.

6. The display panel according to claim 4, wherein a thickness of a portion of the first metal layer which is overlapped with the first portion is equal to a thickness of a portion of the first metal layer which is overlapped with the second portion, wherein a first passivation layer is disposed between the first metal layer and the first alignment layer, the first passivation layer overlaps the second portion and does not overlap the first portion in a direction perpendicular to the first base;

or, in the direction perpendicular to the first base, the first passivation layer overlaps the first portion and the second portion, and a thickness of a portion of the first passivation layer which is overlapped with the first portion is smaller than a thickness of a portion of the first passivation layer which is overlapped with the second portion.

7. The display panel according to claim 4, wherein a first passivation layer is disposed between the first metal layer and the first alignment layer, wherein in a direction perpendicular to the first base, a thickness of a portion of the first metal layer which is overlapped with the first portion is greater than a thickness of a portion of the first metal layer which is overlapped with the second portion;

the first passivation layer overlaps the second portion and does not overlap the first portion in the direction perpendicular to the first base.

8. The display panel according to claim 4, wherein the first metal layer is disposed on an intersection region of an extension line of a data line and an extension line of a scan line, and/or the orthographic projection of the light shielding layer on the first substrate covers an orthographic projection of the first metal layer on the first substrate.

9. A display device, comprising a housing and a display panel, wherein the housing comprises an accommodating space, and the display panel is disposed in the accommodating space, wherein the display panel comprises a first substrate, a second substrate, and a photo spacer, the photo spacer is disposed between the first substrate and the second substrate, the first substrate and/or the second substrate comprise a light shielding layer having a plurality of apertures, and an orthographic projection of the light shielding layer on the first substrate covers at least a portion of the orthographic projection of the photo spacer on the first substrate;

wherein the first substrate comprises a first base and a first alignment layer disposed on one side of the first substrate which faces towards the second substrate, the first alignment layer comprises a first portion and a second portion, the second portion surrounds the first portion, one end of the photo spacer is connected to the second substrate, an other end of the photo spacer corresponds to the first portion, and a distance between the first portion and the second substrate is different from a distance between the second portion and the second substrate;

wherein the first substrate comprises a plurality of metal layers disposed between the first base and the first alignment layer, and one of the plurality of metal layers which is closest to the first alignment layer is a first metal layer, wherein the first metal layer overlaps the first portion and the second portion in a direction perpendicular to the first base;

wherein the distance between the first portion and the second substrate is greater than the distance between the second portion and the second substrate.

10. The display device according to claim 9, wherein in the direction perpendicular to the first base, a thickness of a portion of the first metal layer which is overlapped with the first portion is smaller than a thickness of a portion of the first metal layer which is overlapped with the second portion.

11. The display device according to claim 9, wherein a thickness of a portion of the first metal layer which is overlapped with the first portion is equal to a thickness of a portion of the first metal layer which is overlapped with the second portion, wherein a first passivation layer is disposed between the first metal layer and the first alignment layer, the first passivation layer overlaps the second portion and does not overlap the first portion in a direction perpendicular to the first base;

or, in the direction perpendicular to the first base, the first passivation layer overlaps the first portion and the second portion, and a thickness of a portion of the first passivation layer which is overlapped with the first portion is smaller than a thickness of a portion of the first passivation layer which is overlapped with the second portion.

12. The display device according to claim 9, wherein a first passivation layer is disposed between the first metal layer and the first alignment layer, wherein in a direction perpendicular to the first base, a thickness of a portion of the first metal layer which is overlapped with the first portion is greater than a thickness of a portion of the first metal layer which is overlapped with the second portion;

the first passivation layer overlaps the second portion and does not overlap the first portion in the direction perpendicular to the first base.

13. The display device according to claim 9, wherein the first metal layer is disposed on an intersection region of an extension line of a data line and an extension line of a scan line, and/or the orthographic projection of the light shielding layer on the first substrate covers an orthographic projection of the first metal layer on the first substrate.

* * * * *